Patented Jan. 25, 1944

2,340,012

UNITED STATES PATENT OFFICE 2,340,012

ALCOHOL RECOVERY PROCESS

Henry O. Mottern, Hillside, N. J., assignor, by mesne assignments, to Standard Alcohol Company, Linden, N. J., a corporation of Delaware No Drawing. Application January 1, 1942,
Serial No. 425,349

2 Claims. (Cl. 202—51)

The present invention relates to a process for the recovery of alcohols from dilute acid extracts, particularly those dilute acid extracts which are obtained as a residue from a prior process in which alkyl acid esters are hydrolyzed and distilled to yield olefin hydration products.

Olefin hydration processes, in brief, consist in the absorption of olefin in 60–98% sulfuric acid, or phosphoric acid, which forms an extract of alkyl acid esters. The concentrated extract is then diluted with water to an acid concentration of 35–50% acid strength on an olefin-free basis, hydrolyzed and steam stripped to recover alcohol. Such a process is particularly applicable to the manufacture of secondary aliphatic alcohols although it is also used for preparing tertiary alcohols. The residue from the distillation step is a weak acid, commonly designated as slop acid, which contains from 0.5% to 5% on a volume basis of unrecovered olefin in the form of alcohols and an acid concentration of from 35–50% on an alcohol-free basis. In the ordinary operation of an olefin hydration plant, this slop acid is then put through a recovery process in which it is first concentrated to an acid concentration of from 88–93% strength and then oxidized or bleached after which it is in condition for recycle to the olefin hydration process proper. The acid recovery process contains no provision for the recovery of the residual olefin in the form of alcohol so it is therefore lost during the acid recovery step. Where the olefin hydration product obtained is an alcohol, the quantity of alcohol lost in the slop acid represents about 1–5% of the total alcohol produced. Since a moderately large commercial olefin hydration plant produces from three to five million gallons of slop acid per year, it is readily apparent that the loss of olefin as alcohol during the acid recovery process is enormous.

The principal object of the present invention is the recovery of .5% to 5% by volume of alcohol from the dilute or weak acid recovered from the steam distillation either as alcohol or its corresponding olefin which can be recycled to the absorption and hydrolyzing steps thereby increasing the overall yield of alcohol based upon olefin absorbed. This and other objects of this invention will be apparent to those skilled in the art upon reading the following description. The alcoholic solution obtained as a result of the operation of the process of the present invention may be used as such for the dilution of concentrated extracts in which the olefin corresponding to the alcohol has been absorbed or the alcohols may be concentrated for use in any purpose to which alcohols are customarily applied.

According to the present invention, residual acid extracts or slop acids of sulfuric or phosphoric acid, such as those obtained from an alcohol recovery process in which olefins have been hydrated to alcohols, are heated to a temperature of from 200–400° F. under the pressure developed at these temperatures which ranges from 25 to 125 lbs./sq. in. for a period of from 1–3 hours of batch operation. The time of heating is dependent to a large extent upon the temperature maintained within the pressure still. The lower temperatures and pressures require a longer period of heating and conversely the higher temperatures and pressures cause the liberation of the products in a shorter period of time. Alcohol and some regenerated olefin is taken overhead under pressure. After the alcohol and olefin have been removed, the residual acid is then ready for processing in the ordinary recovery plant. The olefin recovered is used to enrich the feed to an olefin absorber and the alcoholic distillate is either redistilled to obtain concentrated alcohol or used without further processing to dilute rich concentrated acid extracts. This is of a decided advantage because in the hydration of olefin by the absorption-in-acid method the primary object is to maintain as high an olefin-acid ratio as possible. The dilute aqueous alcohol solution can be used for dilution of the strong acid extract thereby making up the usual loss of alcohol in the weak acid recovered from the steam distillation. The process of this invention may be made continuous by adjusting the feed of slop acid to the pressure still to balance the total of the products taken overhead as distillates and the completely stripped acid removed from the pressure still. The aqueous alcoholic distillate recovered is equivalent in amount to about 5% to 12% volume of the slop acid charged to the pressure still. The amount of olefin recovered either as olefin or alcohol ranges from 85–99% of the olefin, in the form of alcohol, present in the slop acid charged to the pressure still.

The process is operated continuously by adjusting the acid feed to the rate of recovery of alcohol and its corresponding olefin. The range of temperature and pressure used for continuous distillation is the same as for batch operation, i. e. 25–125 lbs./sq. in. at 200–400° F. The feed rate is adjusted to allow for a distillation time of 1 to 3 hours, preferably about 1½ hours at 300–350° F.

The following examples are given for the purpose of illustrating the invention:

*Example 1*

873.5 lbs. of slop acid containing 46% sulfuric acid on an alcohol-free basis, containing 0.4% by volume alcohol was charged to a pressure still, heated to 350° F. for a period of three hours. The maximum pressure attained at this temperature was 55–65 lbs./sq. in. 1.125 lbs. of butene in the form of gas was obtained, together with 65.5 lbs. of aqueous distillate containing 0.313 lb. of alcohol.

Example 2

842 lbs. of slop acid containing 44% sulfuric acid on an alcohol-free basis and .88 weight percent alcohol, was charged to a pressure still and distilled at 250° F. under a pressure of 1-10 lbs./sq. in. for three hours. 4.92 lbs. of $C_4$ gas was obtained together with 26 lbs. of aqueous distillate containing .816 lb. of butyl alcohol.

What is claimed is:

1. The process for the recovery of alcohol from dilute acid solutions of alkyl sulfates in slop acid of from 35-50% acid concentration on an alcohol-free basis and containing only sufficient alkyl sulfate capable of yielding not over 5% of alcohol, which comprises heating the slop acid in a pressure vessel to a temperature of from 200°-400° F. under the pressure developed at these temperatures for a period of from 1 to 3 hours, while taking alcohol and olefin off overhead under pressure and condensing the alcohol.

2. A process for the recovery of alcohol from dilute solutions of alkyl sulfates in slop acid of from 35-50% acid concentration on an alcohol-free basis and containing only sufficient alkyl sulfate capable of yielding not over 5% of alcohol, which comprises heating the slop acid in a pressure vessel to a temperature of from 200°-400° F. under a pressure of from 25 to 125 lbs./sq. in. for a period of from 1 to 3 hours, while taking alcohol and olefin off overhead under pressure and condensing the alcohol.

HENRY O. MOTTERN.